United States Patent
Li et al.

(10) Patent No.: US 10,585,405 B2
(45) Date of Patent: Mar. 10, 2020

(54) METHOD AND SYSTEM OF USING AN USB USER INTERFACE IN AN ELECTRONIC TORQUE WRENCH

(71) Applicants: Jie Li, Rancho Santa Margarita, CA (US); Jerry A. King, Hacienda Hts, CA (US); Tingwen Wu, Hacienda Hts, CA (US); Nathan J. Lee, Escondido, CA (US)

(72) Inventors: Jie Li, Rancho Santa Margarita, CA (US); Jerry A. King, Hacienda Hts, CA (US); Tingwen Wu, Hacienda Hts, CA (US); Nathan J. Lee, Escondido, CA (US)

(73) Assignee: Snap-on Incorporated, Kenosha, WI (US)

( * ) Notice: Subject to any disclaimer, the term of this patent is extended or adjusted under 35 U.S.C. 154(b) by 138 days.

(21) Appl. No.: 13/888,685

(22) Filed: May 7, 2013

(65) Prior Publication Data
US 2014/0336810 A1 Nov. 13, 2014

(51) Int. Cl.
*G05B 15/02* (2006.01)
*B25B 23/142* (2006.01)
*G05B 19/18* (2006.01)

(52) U.S. Cl.
CPC .......... *G05B 15/02* (2013.01); *B25B 23/1422* (2013.01); *B25B 23/1425* (2013.01); *G05B 19/182* (2013.01); *G05B 2219/37344* (2013.01)

(58) Field of Classification Search
CPC .. G05B 15/02; G05B 19/182; B25B 23/1422; B25B 23/1425

USPC ......................................................... 700/103
See application file for complete search history.

(56) References Cited

U.S. PATENT DOCUMENTS

| | | | | |
|---|---|---|---|---|
| 5,303,601 | A * | 4/1994 | Schonberger | B25B 23/1425 73/862.21 |
| 6,405,598 | B1 * | 6/2002 | Bareggi | B25B 23/14 73/761 |
| 7,082,866 | B2 * | 8/2006 | Becker | 81/479 |
| 7,565,844 | B2 * | 7/2009 | Crass et al. | 73/862.21 |
| 7,841,100 | B2 * | 11/2010 | Lucke | 33/534 |

(Continued)

FOREIGN PATENT DOCUMENTS

| | | |
|---|---|---|
| CN | 1678812 | 10/2005 |
| EP | 2159006 | 3/2010 |

(Continued)

OTHER PUBLICATIONS

Mountz, TorqueMate Wrench Operation Instructions, San Jose, CA, Mar. 10, 2010, p. 6. Accessed via the Internet on Jun. 22, 2015.*

(Continued)

*Primary Examiner* — Michael J Huntley
(74) *Attorney, Agent, or Firm* — Seyfarth Shaw LLP

(57) ABSTRACT

A communication port interface facilitates downloading of torque and/or angle log information from an electronic torque tool to an external device. Torque and/or angle preset job information may be entered in client software and uploaded from the external device to the electronic torque tool via the communication port interface. Additional information including real time clock information and wrench system parameters may be uploaded to the electronic torque tool via the communication port interface.

8 Claims, 7 Drawing Sheets

(56) References Cited

U.S. PATENT DOCUMENTS

| | | | |
|---|---|---|---|
| 8,549,932 B1* | 10/2013 | Schultz et al. | 73/862.21 |
| 2003/0105599 A1* | 6/2003 | Fisher | B23P 19/066 |
| | | | 702/41 |
| 2005/0173142 A1 | 8/2005 | Cutler et al. | |
| 2005/0173172 A1* | 8/2005 | Artis | B60K 26/021 |
| | | | 180/178 |
| 2005/0223856 A1* | 10/2005 | Reynertson et al. | 81/467 |
| 2005/0223857 A1 | 10/2005 | Reynertson et al. | |
| 2006/0090077 A1* | 4/2006 | Little | G06F 21/10 |
| | | | 713/184 |
| 2007/0144270 A1* | 6/2007 | Crass | B25B 23/1425 |
| | | | 73/862.21 |
| 2010/0199782 A1* | 8/2010 | Hsieh | 73/862.23 |
| 2010/0216415 A1* | 8/2010 | Arimura | G08C 17/02 |
| | | | 455/90.1 |
| 2011/0132157 A1* | 6/2011 | Duvan et al. | 81/479 |
| 2011/0191515 A1* | 8/2011 | Luk | G04C 11/02 |
| | | | 710/303 |
| 2011/0291647 A1* | 12/2011 | Lee et al. | 324/207.25 |
| 2012/0095961 A1* | 4/2012 | Meyer | G07C 3/00 |
| | | | 707/634 |
| 2012/0118078 A1* | 5/2012 | Chen | 73/862.21 |
| 2012/0234569 A1* | 9/2012 | Lawton et al. | 173/181 |
| 2013/0212420 A1* | 8/2013 | Lawson | G05B 19/4185 |
| | | | 713/400 |
| 2014/0067328 A1* | 3/2014 | Pape et al. | 702/187 |
| 2014/0069211 A1* | 3/2014 | Backhaus et al. | 73/862.23 |
| 2014/0316421 A1* | 10/2014 | Sanders | 606/102 |
| 2015/0247745 A1* | 9/2015 | McClogan | B25B 23/1425 |
| | | | 702/33 |

FOREIGN PATENT DOCUMENTS

| | | |
|---|---|---|
| JP | 2010-179451 | 8/2010 |
| TW | 201233504 A | 8/2012 |
| TW | 201238720 | 10/2012 |
| TW | M444251 | 1/2013 |
| WO | WO 2004/028749 | 4/2004 |

OTHER PUBLICATIONS

PalmGadget, "SyncTime," 2006, Accessed via the Internet on Jun. 22, 2015.*

SCS Concept Group, "Freedom3 User Manual", Feb. 4, 2012 (accessed from <<http://www.aimco-global.com/Data/Sites/1/manuals/user-manual-freedom3-spc-sqnet-eng.pdf>> on Nov. 16, 2017).*

Kepware Technologies, "Torque Tool Ethernet Driver Help", Feb. 21, 2012 (accessed from http://www.logic-control.com/datasheets/14/Manuals/Drivers/Torque%20Tool/Torque%20Tool%20Ethernet%20Driver.pdf on Dec. 17, 2018). (Year: 2012).*

Taiwan Office Action and Search Report dated May 19, 2015; 5 pages.

English Translation of Taiwan Office Action and Search Report dated May 19, 2015; 1 page.

Great Britain Combined Search and Examination Report for GB 1407732.5, dated Sep. 23, 2014.

Australian Government Patent Examination Report No. 2, dated Sep. 17, 2015, 4 pages.

Mountz, TorqueMate Wrench Operation Instructions (Rev. 1.0 Mar. 10, 2010) San Jose, CA; dated Mar. 10, 2010; retrieved from Internet on Oct. 12, 2015; 19 pages.

English Translation of Taiwan Office Action dated May 15, 2015; 8 pages.

Australian Government, Patent Examination Report No. 1, dated May 11, 2015; 5 pages.

Australian Application 2014202205 Patent Examination Report No. 2 dated Sep. 17, 2015.

UK Examination Report for Application No. 1407732.5 dated Jun. 23, 2017, 4 pages.

State Intellectual Property Office of P.R. China, Second Office Action, dated Apr. 5, 2017, 8 pages.

Chinese Office Action for Application No. 201410185700.2, dated Sep. 4, 2017, 6 pages.

UK Office Action for Application No. GB1407732.5, dated Oct. 18, 2017, 4 pages.

* cited by examiner

METHOD AND SYSTEM OF USING AN USB USER INTERFACE IN AN ELECTRONIC TORQUE WRENCH

TECHNICAL FIELD OF THE INVENTION

The present application relates to a tool for applying torque to a workpiece. Particularly, the present application relates to an electronic torque wrench configured for exchanging data and settings with an external device.

BACKGROUND OF THE INVENTION

Precision tools, such as torque wrenches, are commonly used in automotive and industrial applications to apply a predetermined torque and/or angular displacement to a work piece such as a threaded fastener, for example. A particular torque and/or angular displacement may be specified in a job specification or work schedule to be applied to each work piece in a job. The precision tools are commonly adjustable and may be manually configured to apply the specified torque and/or angular displacement to each work piece in the job. Once a specified torque or angle setting is configured, the precision tool may prevent a user from exceeding a specified torque or angular displacement by actuating a mechanical release between the force applicator or handle of the tool and the work piece or head of the tool, for example. Alternately, the precision tool may simply indicate when the specified torque and/or angular displacement has been applied by providing a tactile, audible or visual indication, for example. For jobs that involve numerous different torque and/or displacement specifications, the process of resetting the tool for each different specification may be slow and labor intensive and introduces opportunities for errors.

Precision tools, such as torque wrenches, are also commonly used to measure the applied torque and/or angular displacement applied to a work piece. In many applications, the measurements of torque and/or angular displacement that are acquired by the use of such precision tools are manually recorded in a log for quality assurance purposes. The process of manually recording measurements in a log is also slow and labor intensive and introduces further opportunities for errors.

SUMMARY OF THE INVENTION

According to an aspect of the present disclosure, an electronic torque tool is configured with a universal serial bus (USB) interface. Client software may be executed on an external device such as a personal computer (PC) to populate a data set for input to the electronic torque tool or to receive measured data from the electronic torque tool via the USB interface. The USB interface may also be used to provide real time clock settings, software updates or other configuration information from an external device to the electronic torque tool.

A method according to one aspect of the present disclosure includes entering at least one set of preset job parameters to a computing device, such as a PC. The preset job parameters may include at least one torque setting and/or angular displacement setting and at least one identifier corresponding to the torque setting and/or angular displacement setting. The job parameters may be communicated from the computing device to electronic torque wrench via a USB interface.

A method according to another aspect of the present disclosure includes storing a set of torque measurements in a memory of an electronic torque wrench and communicating the set of torque measurements from the electronic torque wrench to an external computing device via a USB interface.

A method according to another aspect of the present disclosure includes receiving a real time clock setting from a computing device via a USB interface and configuring a clock of an electronic torque wrench based on the real-time clock setting. A method according to another aspect of the present disclosure includes receiving preset job parameters, tool identifiers, tool system parameters and/or software updates to an electronic torque tool from a computing device via a USB interface.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

Figure 1:
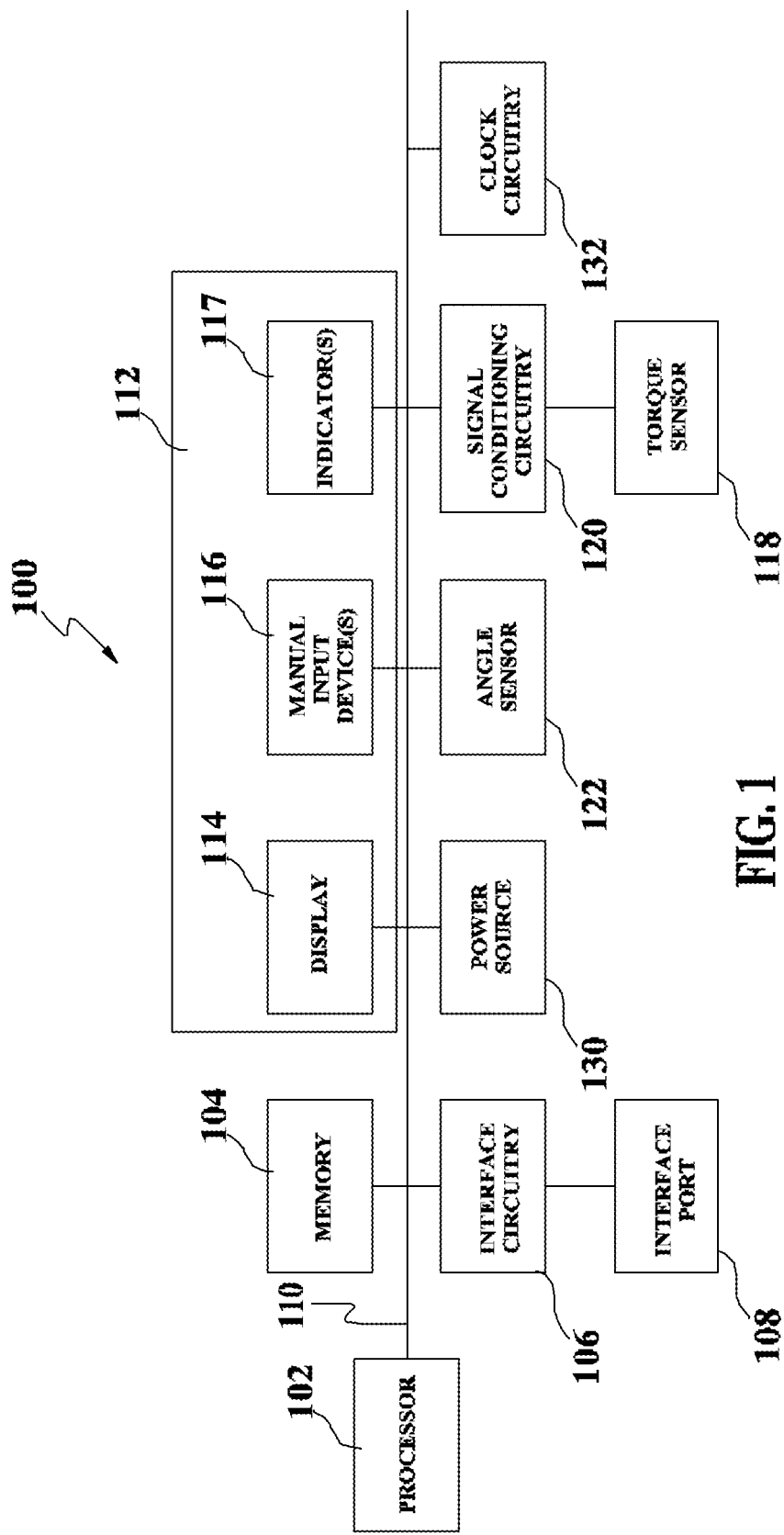
FIG. 1 is a block diagram illustrating a torque tool in accordance with an embodiment of the present application.

It should be understood that the comments included in the notes as well as the materials, dimensions and tolerances discussed therein are simply proposals such that one skilled in the art would be able to modify the proposals within the scope of the present application.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated.

The present disclosure involves incorporating a universal serial bus (USB) interface into a tool adapted to apply torque to work pieces, such as threaded fasteners, bolts, and nuts, such as, for example, an electronic torque wrench, to provide a computer interface for the users and wrench manufacturers. To meet the demands of automotive, industrial applications, or quality control, electronic torque wrenches may be pre-loaded with sets of torque and/or angle job presets. An embodiment of the present disclosure includes a personal computer (PC) based client software tool for communicating with electronic torque wrenches. The PC based client software tool facilitates setting up the torque and/or angle jobs using a communication port interface, such as, for example, universal serial bus (USB), Firewire, serial, parallel, infrared, wireless, or Thunderbolt port.

According to an aspect of the present disclosure, an electronic torque wrench has the capability to store torque and angle log information, representing respective amounts of torque or angular displacement applied to work pieces, into an internal memory such as a flash memory configured on the electronic torque wrench. A method for downloading the log into a computer system for records, archives or quality audit purposes is also disclosed.

Referring to FIG. 1, according to an aspect of the present disclosure, a tool adapted to apply torque to work pieces, such as an electronic torque wrench 100, includes a processor 102 and a memory 104 coupled to the processor. The tool 100 also includes interface circuitry 106 operably coupled to a communication interface port 108, such as a universal serial bus (USB), Firewire, serial, parallel, infrared, wireless, or Thunderbolt port, for example. The interface circuitry 106 and memory 104 may be coupled to the processor by one or more internal signal paths 110.

The processor 102 facilitates communication between various components of the tool 100 and controls operation of various electrical components of the tool 100. According to an aspect of the present disclosure, the memory 104 can store data or computer programs for use with the tool 100. For example, the memory 104 may be used to store preset torque and angle target values for use in an automatic setting, or store temporary torque and angle target values, for example. Without limitation, the memory 104 can include a non-transitory computer-readable recording medium, such as a hard drive, DVD, CD, flash drive, volatile or nonvolatile memory, RAM, or any other type of data storage, for example.

The tool 100 may also include user interface circuitry 112 coupled to the processor 102. The user interface circuitry 112 may include a display 114 and one or more manual input devices 116, such as a set of buttons, for example. Alternately, the display 114 and input devices 116 may be integrated in a single device, such as a touch screen that performs both display and manual input functions. The user interface circuitry 112 may also include one or more indicators 117 such as, for example, light emitting diodes (LEDs) coupled to the processor 102 to provide feedback to a user.

According to one aspect of the present disclosure, the tool 100 also includes a torque sensor 118, such as strain gauge or load cell, for example, coupled to the processor 102, which is adapted to measure the amount of torque applied by the tool to a work piece. The torque sensor 118 may include signal conditioning circuitry 120, such as analog to digital converter circuitry, configured to convert an analog strain gauge or load cell output signal to a digital signal format suitable for input to or use by the processor 102, for example. An angular displacement sensor 122, which may be incorporated into the torque sensor 118 and which is adapted to measure the amount of angular displacement of the work piece, may also be coupled to the processor 102. The angular displacement sensor 122 may include a microelectromechanical system (MEMS) gyroscope, for example.

A power source 130 and clock circuitry 132 are also coupled to the processor 102. The power source 130 may include a source of electrical or power, such as one or more batteries, fuel cell, or solar cells, for example. The clock circuitry 132 may be configured to display the time, provide time stamp for torque and angle measurements, and/or to facilitate timing of various processes involved in preset torque or angle jobs, for example.

In an embodiment, the display 114 can display various information for the user to view and interpret, for example, stored or real-time measurements of torque or angular displacement, presets, or other text or graphic information. By way of example, the display 114 can include a liquid crystal display (LCD), organic light emitting diode (OLED) display, plasma screen, cathode ray tube display, or any other kind of black and white or color display that will allow the user to view and interpret information.

The indicators 117 can include structures that visually, audibly, or through tactile means, indicate to the user when a predetermined torque or angle target is reached. For example, the indicators 117 can include one or more LEDs and LCD backlight that illuminate when a preset torque or angular displacement is reached. Alternately, the indicators 117 can include a vibration mechanism that vibrates when the preset torque or angular displacement is reached.

Figure 2:
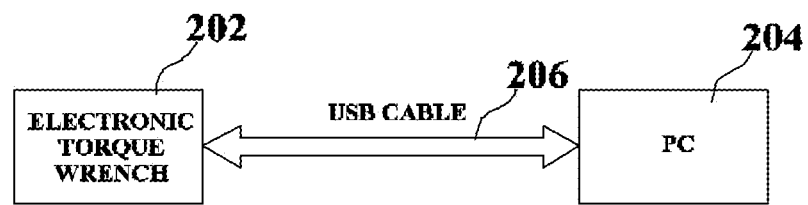
FIG. 2 is a block diagram illustrating a torque tool coupled to an external device according to an embodiment of the present application.

Referring to FIG. 2, according to one aspect of the present disclosure, a tool, such as an electronic torque wrench 202, may be coupled to an external device such as a personal computer 204 using a standard interface connector such as a USB cable 206, for example. This allows information such as preset job parameters, calibration information, wrench system parameters and wrench system software updates, for example, to be input to the electronic torque wrench 202 from the PC 204. The connection between the electronic torque wrench 202 and the PC 204 also allows torque and/or angular displacement measurements, representing stored torque and/or angular application to work pieces, to be downloaded from the electronic torque wrench 202 to a log on the PC, for example.

Figure 3:
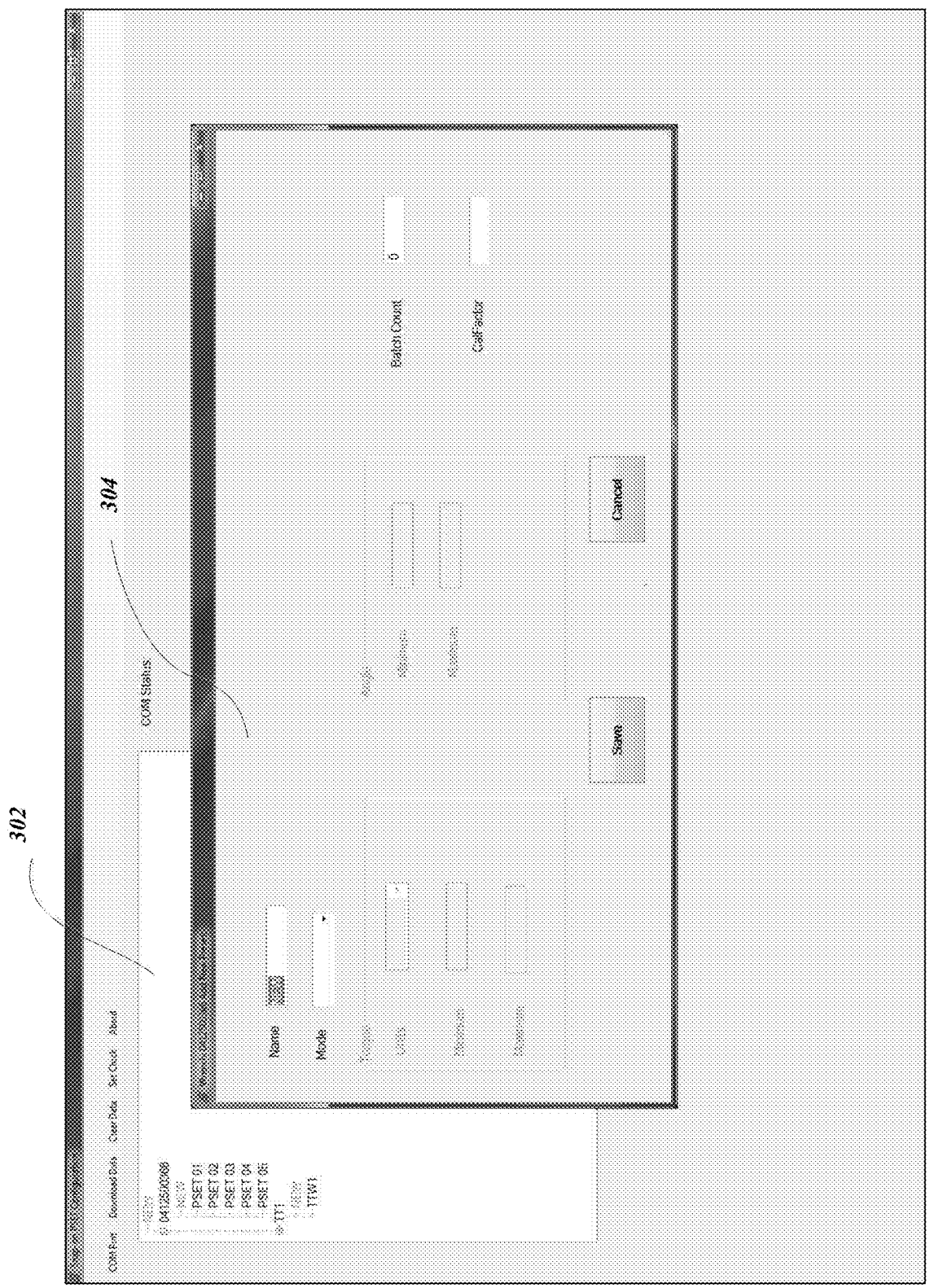
FIG. 3 is an example of a graphical user interface for entering set up information to configure preset jobs on the electronic torque wrench according to an embodiment of the present application.

Referring to FIGS. 2 and 3, the PC 204 may be configured to execute client software that provides a graphical user interface for entering set up information to configure preset jobs on the electronic torque wrench 202, for example. The client software may be configured to present one or more display screens 302 to a user for displaying the preset job settings and/or one or more data entry screens 304 to facilitate entry of new job settings or modifying existing job settings in a data set. An example of several preset job setting shown in FIG. 3 include a job identifier that may be a job number or preset name as shown and a set of parameters that correspond to the job identifier. For each job identifier, the set of parameters may include a mode selection, a minimum torque setting, a maximum torque setting, a units selection, a minimum angle setting, a maximum angle setting, a batch count and a calibration factor, for example. The mode selector is used to configure the electronic torque wrench in a particular mode, such as a torque only mode, an angle only mode, a torque then angle mode, an angle then torque mode, and a simultaneous angle and torque mode, for example.

Figure 4:
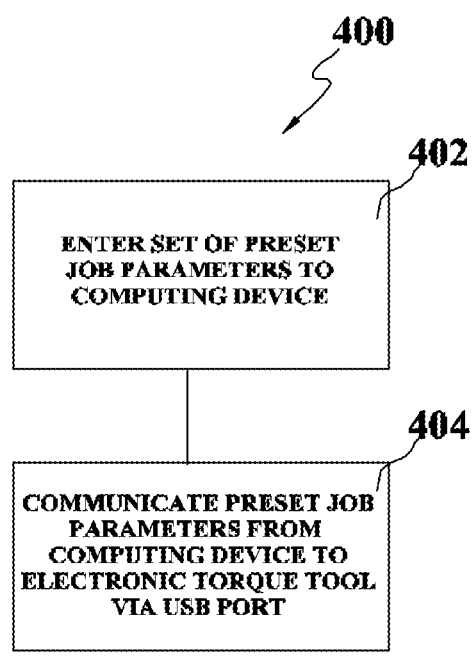
FIG. 4 is a process flow diagram illustrating a method for entering preset job parameters for an electronic torque tool according to an embodiment of the present application.

FIG. 4 is a process flow diagram illustrating a process 400 according to an aspect of the present disclosure. The process may be performed by a user of a personal computer, for example. As shown, the process 400 begins and proceeds to step 402, which includes entering at least one set of preset job parameters to a computing device, such as a PC. The preset job parameters may include at least one torque setting, representing the amount of torque that should be applied to a work piece, and at least one identifier corresponding to the torque setting. In step 404, the method includes communicating the set(s) of preset job parameters from the computing device to the electronic torque wrench.

According to an aspect of the present disclosure, the preset job parameters may include at least one angular displacement setting, representing the amount of angular displacement that should be applied to a work piece, corresponding to the torque setting. The preset job parameters may also include a calibration factor corresponding to the torque setting. Other preset job parameters that may be included in the set(s) of preset job parameters according to aspects of the present disclosure include minimum torque settings, maximum torque settings, minimum angle setting and maximum angle settings corresponding to each job identifier, for example.

According to another aspect of the present disclosure, the set of preset job parameters includes a mode selector, wherein the mode selector may select a torque only mode, an angle only mode, a torque then angle mode, an angle then torque mode, or a simultaneous torque and angle mode.

Figure 5:
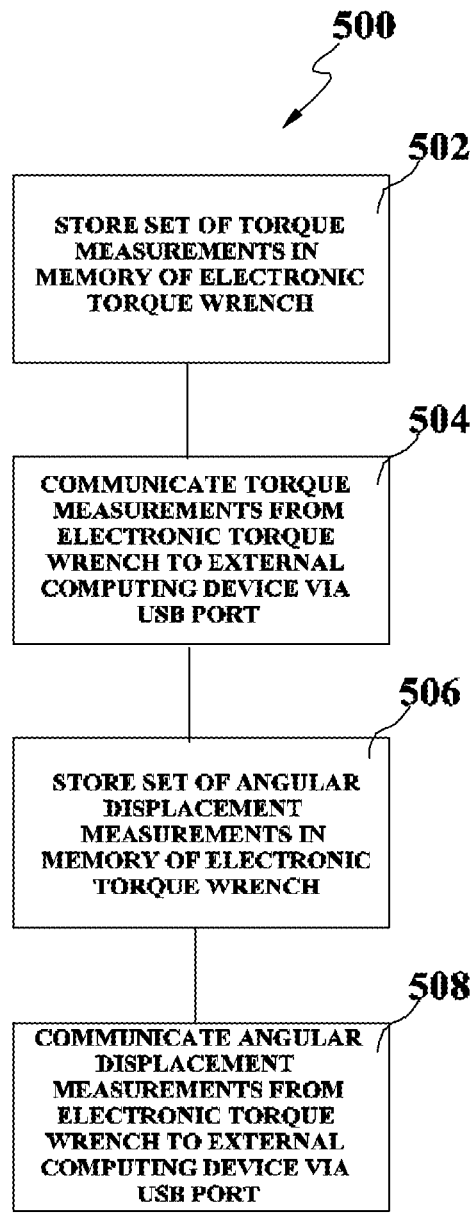
FIG. 5 is a process flow diagram illustrating a method for communicating measured data from an electronic torque tool to an external device according to an embodiment of the present application.

FIG. 5 is a process flow diagram illustrating a process 500 according to an aspect of the present disclosure. The process may be performed on a tool adapted to apply torque to a work piece, such as an electronic torque wrench, coupled to a personal computer via a cable, such as universal serial bus (USB), Firewire, serial, parallel, wireless, infrared, or THUNDERBOLT™ cable for example. As shown, the process 500 begins and proceeds to step 502, which includes storing a set of torque measurements in a memory of an electronic torque wrench. In step 504, the method includes communicating the set of torque measurements from the electronic torque wrench to an external computing device.

According to an aspect of the present disclosure, the set of torque measurements corresponds to a set of preset job parameters stored in the memory of the electronic torque wrench. According to another aspect of the present disclosure, communicating the set of torque measurements from the electronic torque wrench to an external computing device includes communicating the set of torque measurements representing the amounts of torque applied to work pieces by the torque wrench, from the memory of the electronic torque wrench to a communication port, such as a USB port, of the electronic torque wrench.

In step 506, the method includes storing a set of angular displacement measurements in the memory of the electronic torque wrench. The set of angular displacement measurements corresponds to the set of preset job parameters stored in the memory of the electronic torque wrench. In step 508, the method includes communicating the set of angular displacement measurements from the electronic torque wrench to the external computing device.

Figure 6:
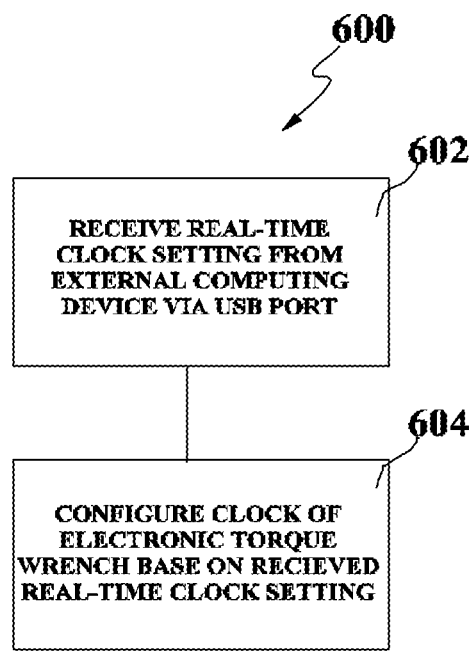
FIG. 6 is a process flow diagram illustrating a method for communicating real time clock settings to an electronic torque tool from an external device according to an embodiment of the present application.

FIG. 6 is a process flow diagram illustrating a process 600 according to an aspect of the present disclosure. The process may be performed on a tool adapted to apply torque to a work piece, such as an electronic torque wrench, including a communication port, such as a USB port, coupled to a personal computer via a communication cable, such as a USB cable, for example. As shown, the process 600 begins and proceeds to step 602, which includes receiving a real time clock setting from a computing device. In an embodiment, the real time clock can be used to time stamp data stored in the tool, such as, for example, the stored torque measurements or stored angular displacement measurements. In block 604, the method includes configuring a clock of electronic torque wrench based on the real-time clock setting.

Figure 7:
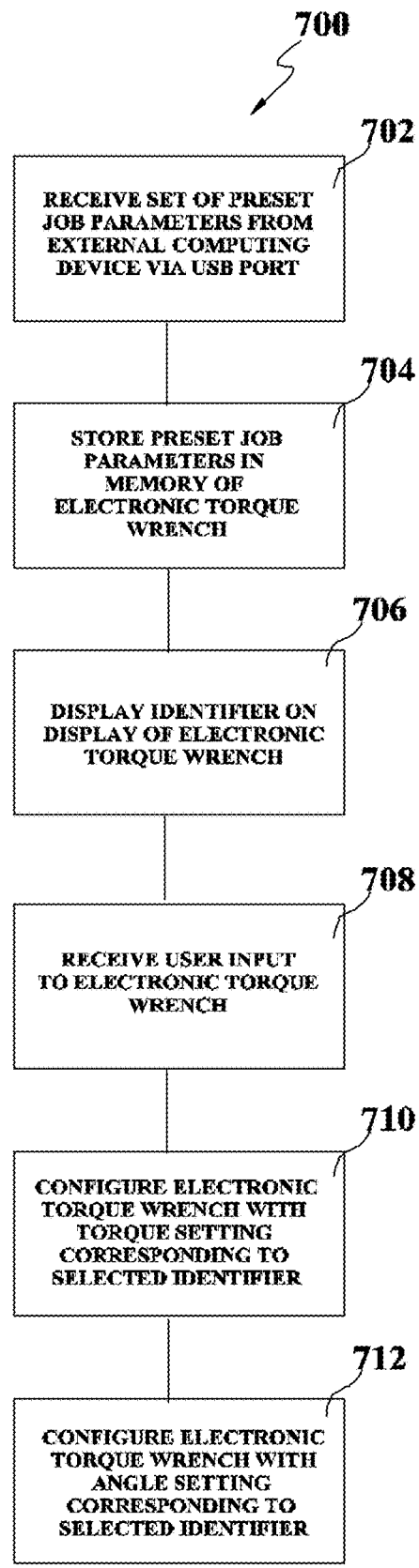
FIG. 7 is a process flow diagram illustrating a method of communicating preset job parameters to an electronic torque tool from an external device according to an embodiment of the present application.

FIG. 7 is a process flow diagram illustrating a process 700 according to an aspect of the present disclosure. The process may be performed on a tool adapted to apply torque to a work piece, such as an electronic torque wrench, including a communication port, such as a USB port, coupled to a personal computer via a communication cable, such as a USB cable, for example. As shown, the process 700 begins and proceeds to step 702, which includes receiving at least one set of preset job parameters from a computing device. The preset job parameters may include at least one torque setting and at least one identifier corresponding to the at least one torque setting, for example. In step 704, the method includes storing the set of preset job parameters in a memory of an electronic torque wrench. According to an aspect of the present disclosure, the set of preset job parameters may also include at least one angular displacement setting corresponding to the a torque setting.

In step 706, the method includes displaying the identifier on a display of the electronic torque wrench and in step 708 the method includes receiving a user input to the electronic torque wrench. The user input may indicate a selection of the identifier, for example. In step 710, the method includes configuring the electronic torque wrench with the torque setting corresponding to the selected identifier. In step 712, the method further includes configuring the electronic torque wrench with the at least one angular displacement setting corresponding to the selected identifier.

According to an aspect of the present disclosure, a tool specific identifier such as a serial number and/or model number may be received from a computing device to an electronic torque wrench via a communication port, such as a USB port, configured on the electronic torque wrench. The tool specific identifier may be stored in the memory of the electronic torque wrench. According to another aspect of the present disclosure, a tool software update may be received to an electronic torque wrench via a communication port, USB port, configured on the electronic torque wrench. The software update may be stored in the memory of the electronic torque wrench. According to another aspect of the present disclosure, a set of wrench system parameters may be received to an electronic torque wrench via a communication port, such as a USB port, configured on the electronic torque wrench. The wrench system parameters may be stored in the memory of the electronic torque wrench. According to this aspect of the disclosure, an electronic torque wrench may be configured using the wrench system parameters stored in its memory.

According to another aspect of the present disclosure an electronic torque tool includes a processor, a memory coupled to the processor, a torque sensor coupled to the processor and interface circuit, such as universal serial bus (USB) interface circuit, coupled to the processor. Instructions are stored in the memory and are executable by the processor to receive at least one set of preset job parameters from a computing device via the interface circuitry and store the set of preset job parameters the memory. According to aspects of the present disclosure, the preset job parameters may include at least one torque setting and at least one identifier corresponding to the torque setting. The instructions may further include instructions executable by the processor to store a set of torque measurements in the memory, and communicate the set of torque measurements from the electronic torque tool to an external computing device via the interface circuitry.

As discussed above, the tool 100 may be an electronic torque wrench. However, it should be understood that the tool 100 can be any mechanism for applying torque to a work piece without departing from the scope of the present application. For example, and without limitation, the precision tool 100 can be a ratchet wrench, open wrench, monkey wrench, or any other tool capable of applying torque to a work piece.

As used herein, the term "coupled" or "communicably coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method of communicating for a tool having a memory and that is adapted to apply amounts of torque to respective work pieces, comprising:
   communicably coupling an external computing device to the memory;
   receiving, from the external computing device, job parameters including a torque setting, a torque identifier corresponding to the torque setting, an amount of angular displacement setting, and a mode of operation of the tool corresponding to a mode of first measuring an amount of torque applied to a work piece and then measuring an amount of angle applied to the work piece;
   receiving, from the external computing device, a tool identifier that uniquely identifies the tool;
   storing, in the memory, the job parameters and the tool identifier;
   receiving, from the external computing device, a real time clock value;
   configuring a real time clock setting of the tool based on the real time clock value;
   for each work piece that torque is applied to, time stamping a torque value representing the amount of torque applied by the tool to the work piece with a time calculated by the real time clock setting of the tool, representing when the tool applied the amount of torque to the work piece relative to the real time clock setting, thereby creating a time stamped torque value;
   storing, in the memory, each of the time stamped torque values; and
   communicating, to the external computing device, each of the stored time stamped torque values and the tool identifier from the tool.

2. The method of claim 1, further comprising:
   displaying the torque identifier on a display operably coupled to the tool;
   receiving an input indicating a selection of the torque identifier to establish a selected identifier; and
   configuring the tool with the torque setting corresponding to the selected identifier.

3. The method of claim 2, further comprising:
   configuring the tool with the amount of angular displacement setting, wherein the amount of angular displacement setting corresponds to the selected identifier.

4. The method as claimed in claim 1, wherein the torque values further include respective corresponding amounts of angular displacement applied by the tool to respective work pieces.

5. A tool adapted to respectively apply amounts of torque to respective work pieces, comprising:
   a processor;
   a memory coupled to the processor;
   a torque sensor operably coupled to the processor; and
   instructions stored in the memory and executable by the processor to:
      communicably couple an external computing device to the tool;
      receive, from the external computing device, job parameters including a torque setting, a torque identifier corresponding to the torque setting, an amount of angular displacement setting, and a mode of operation of the tool corresponding to a mode of first measuring an amount of torque applied to a work piece and then measuring an amount of angle applied to the work piece;
      receive, from the external computing device, a tool identifier that uniquely identifies the tool;
      store, in the memory, the job parameters and the tool identifier;
      receive, from the external computing device, a real time clock value, configure a real time clock setting of the tool based on the real time clock value;
      for each work piece that torque is applied to, time stamp a torque value representing the amount of torque applied by the tool to the work piece with a time calculated by the real time clock setting of the tool, representing when the tool applied the amount of torque to the work piece relative to the real time clock setting, thereby creating a time stamped torque value;
      store, in the memory, each of the time stamped torque values; and
      communicate, to the external computing device, each of the stored time stamped torque values and the tool identifier from the tool.

6. The tool of claim 5, wherein the instructions are further executable by the processor to:
   display the torque identifier on a display operably coupled to the tool;
   receive an input from a user indicating a selection of the torque identifier to establish a selected identifier; and
   configure the tool with the torque setting corresponding to the selected identifier.

7. The tool of claim 6, wherein the instructions are further executable by the processor to configure the tool with the amount of angular displacement setting, wherein the amount of angular displacement setting corresponds to the selected identifier.

8. The tool as claimed in claim 5, wherein the torque values further include respective corresponding amounts of angular displacement applied by the tool to respective work pieces.

* * * * *